United States Patent [19]

Case

[11] Patent Number: 4,547,037
[45] Date of Patent: Oct. 15, 1985

[54] HOLOGRAPHIC METHOD FOR PRODUCING DESIRED WAVEFRONT TRANSFORMATIONS

[75] Inventor: Steven K. Case, St. Louis Park, Minn.

[73] Assignee: Regents of the University of Minnesota, Minneapolis, Minn.

[21] Appl. No.: 197,481

[22] Filed: Oct. 16, 1980

[51] Int. Cl.⁴ .......................... G03H 1/26; G03H 1/20
[52] U.S. Cl. .................................... 350/3.75; 350/3.69
[58] Field of Search .................... 350/3.69, 3.62, 3.67, 350/3.68, 3.66, 3.7, 3.77, 3.79, 3.8, 3.75, 3.70, 3.72, 3.73

[56] References Cited

U.S. PATENT DOCUMENTS

| | | | |
|---|---|---|---|
| 3,522,979 | 8/1970 | Wuerker | 350/3.69 |
| 3,545,834 | 12/1970 | Gerritsen et al. | 350/3.79 |
| 3,591,252 | 7/1971 | Lu | 350/3.66 |
| 3,628,847 | 12/1971 | Bostwick | 350/3.73 |
| 3,671,106 | 6/1972 | Groh | 350/3.68 |
| 3,743,376 | 7/1973 | Russell | 350/3.73 |
| 3,947,085 | 3/1976 | Mottier | 350/3.69 |
| 4,084,880 | 4/1978 | Clow | 350/162 R |
| 4,118,124 | 10/1978 | Matsuda | 350/3.73 |
| 4,138,190 | 2/1979 | Bryngdahl | 350/3.7 |
| 4,307,929 | 12/1981 | Eveleth | 350/3.71 |

OTHER PUBLICATIONS

*Applied Optics* "Volume Holograms Constructed with Computer-Generated Masks", S. K. Case and W. J. Dallas, Aug. 15, 1978, vol. 17, No. 16, pp. 2537–2540.

*Primary Examiner*—John K. Corbin
*Assistant Examiner*—William Propp
*Attorney, Agent, or Firm*—Peterson, Wicks, Nemer & Kamrath

[57] ABSTRACT

The method utilizes a multi-faceted holographic optical element, the various individual diffraction gratings of each facet collectively functioning to effect a desired wavefront transformation. In this way, a laser beam can be transformed into a specific pattern, permitting unusually shaped objects to be efficiently illuminated with laser light.

19 Claims, 15 Drawing Figures

HOLOGRAPHIC METHOD FOR PRODUCING DESIRED WAVEFRONT TRANSFORMATIONS

CROSS REFERENCE TO RELATED APPLICATION

Reference is made to U.S. Pat. No. 4,455,061 for "MULTI-FACETED HOLOGRAPHIC OPTICAL ELEMENT AND METHODS OF MAKING AND USING SAME".

BACKGROUND OF THE INVENTION

1. Field of the Invention

This invention relates generally to holographic optical elements, and pertains more specifically to a method for realizing an arbitrary wavefront transformation.

2. Description of the Prior Art

In a number of situations, we assume that it is desired to illuminate an object with coherent light such as that from a laser. Since laser beams generally have a rather small cross-sectional diameter, typically on the order of a few millimeters, the beam must be expanded and/or spatially redistributed in order to illuminate most objects.

Where an optical system is only concerned with an expansion of the input light, then a conventional lens can be used. However, where the input wave front should be transformed into an output wave front having arbitrarily specific amplitude and phase so that its energy is redistributed into a more usable form, a conventional lens system is not practical. The problem has been recognized, and optical elements have been fabricated whose end results can only be currently produced by expensive and/or inefficient methods. With the growth in the optics field brought about by the increasingly more common use of lasers, the need for custom wavefront transforming lenses is steadily increasing. Hence, efforts have been made to convert laser beam energy into more appropriately patterned output beams or wave fronts.

One system known to me has involved the conversion of a "donut mode" input laser beam into an output beam with energy at its center. To do this, a pair of optically reflective members were used, one being a cone and the other a "negative cone". However, such a system works well only where a rather simple redistribution of the energy is required. Where a more complicated redistribution is needed, one could not easily grind or otherwise shape the required element which might require locally varying radii of curvature or discontinuous surfaces. The alluded-to prior art system also has the drawback or disadvantage of being quite heavy, as well as being costly and difficult to provide. Where a more complicated redistribution pattern is required, the costs escalate appreciably and sometimes the design proves to be so intricate, such as where abruptly varying curvatures are involved, as to make the needed geometry virtually impossible to realize.

Another system for converting a laser beam involves expanding the beam followed by attenuation at specified spatial locations in order to produce the desired pattern. In this instance, the expanded laser beam is passed through a stencil in order to form an image on the laser beam. While the stencil is quite inexpensive, it has the shortcoming of absorbing very expensive laser light; this necessitates the use of a laser having a far greater power rating than if the absorption were avoided.

Still another method recently made public uses reflecting micro-mirrors to locally alter the direction of propagation of an incident beam, thereby changing the beam intensity at a distance spaced from the optical element. Such a system is being marketed by Spawr Optical Research, Inc., Corona, Calif. 91720. Low-cost optical elements can be produced utilizing the teachings of this system as long as a number are produced from one master. A distinct disadvantage of the marketed system resides in the fact that the object must be located exactly at the target plane since the illumination light will diverge and change its intensity profile at other distances. This system is most useful for delivering laser energy to specific locations. Such a system will not provide suitable illumination for many coherent optical processes, such as interferometry, because of the rapidly varying phase across the incident wave front at the target plane.

Computer-generated holograms are presently being used for various applications, and still another method would be to use a computer-generated hologram to produce the desired wave front. However, as explained in my co-pending application, hereinbefore identified, the efficiency of a computer-generated hologram is quite limited inasmuch as only a few percent of the incident energy goes into the image that is desired. While the efficiency can be improved by using the image as the object for the construction of a second, interferometrically formed hologram, the entire process is still extremely limited in terms of the number of resolution cells in the image. Of course, the costs are compounded because of the need to produce the additional hologram.

SUMMARY OF THE INVENTION

Accordingly, one important object of my invention is to provide a highly efficient method for transforming laser light energy into a desired illumination pattern. More specifically, an aim of the invention is to redistribute the incident laser energy so that it will impinge upon areas, objects or portions of objects requiring illumination, avoiding the waste of light energy striking surfaces where illumination is not desired.

Another object is to provide a method involving a lightweight holographic optical element that can be inexpensively custom made to produce the desired light pattern.

Yet another object is to provide a method for producing arbitrary wavefront transformations that do not require the object to be illuminated to be located exactly in one target plane. Stated somewhat differently, the object to be illuminated can be located at a distance from the holographic optical system made use of in practicing my invention.

Another object of the invention is to permit the facile copying of a master hologram.

The invention has for still another object the redistribution of light energy so that the resulting output beam has a uniform intensity. Thus, my invention permits the achieving of output wave fronts having a uniform light intensity or a light intensity that varies in accordance with a pattern that utilizes the laser energy most effectively. Stated more succinctly, my invention permits the realization of an output beam that will illuminate an object at locations where the object should be illuminated and not where light energy would be wasted.

Briefly, my invention envisages the use of a first holographic optical element or hologram having a number of small facets, each of which is provided with a diffraction grating so as to direct light passing through a particular facet of the first element in a particular direction as it leaves the first element. Thus light leaving different portions of the first hologram propagates in different directions such that at a second plane located some distance after the first hologram, the light has been spatially redistributed into some desired intensity distribution. A second holographic element or hologram located at the second plane receives the light from the first element and by reason of the gratings contained in each of the facets of the second element produces an output beam or wave front in which all of the light is propagating in a desired final direction and has a desired phase distribution across the entire wave front.

DESCRIPTION OF THE PREFERRED EMBODIMENT

Figure 1:
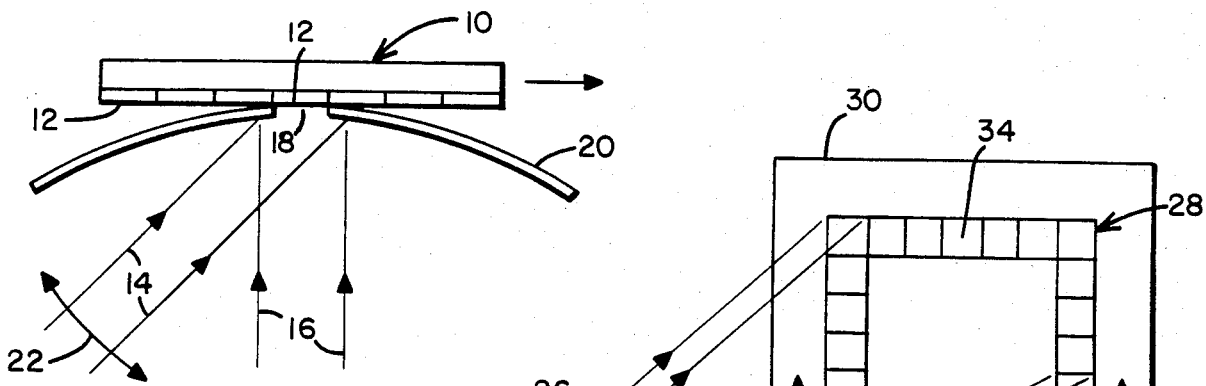
FIG. 1 is a top plan view illustrating how one facet of the first holographic optical element is constructed when practicing my invention.

Even though the manner in which a multi-faceted volume holographic optical element is constructed is more fully described in my said co-pending patent application, hereinbefore identified, it can be explained that a first holographic optical element 10 in FIG. 1 is formed by subjecting each facet 12 individually to an object beam or wave front 14 and simultaneously to a reference beam or wave front 16. This is done via an aperture 18 formed in a flexible mask, such as that identified by the reference numeral 20 in FIG. 1.

In making the first hologram 10, the film that results in this element or unit is translated into the proper position so that only one facet 12 is in registry with the aperture 18 of the mask 20 at any given moment. The mask 20 is in contact with the film in the making of the holographic optical element 10 so that the object and reference beams 14 and 16, respectively, passing through the aperture 18 will overlap completely at the film plane without any shadowing or diffraction from the mask 20. As pointed out in my co-pending application, the mask is thin and slightly flexible so that it can contact, but not scratch, the film. The reference beam 16, of course, is incident at the same angle for every facet 12, assuming that the eventual readout wave is to be a plane wave; if the readout beam is not to be a plane wave, then the hologram or element should be constructed so that the reference wave angle is the same as the angle that the eventual readout wave will have as far as any given facet is concerned. The incidence angle of the signal or object beam is, of course, adjusted for each facet to correspond to the desired eventual output angle for that facet. The object beam adjustment is indicated by the double arrow 22 in FIG. 1 although as mentioned previously, the adjustment angle could be both in and out of the plane of the drawing. In other words, it is the object beam 14, more particularly the angle at which it is directed, that produces the proper diffraction grating within the particular facet 12 being exposed. After one facet has been exposed, then the film that is to constitute the holographic optical element 10 is translated so that the next facet to be exposed is brought into registry with the aperture. Then, the signal or object beam is adjusted or set at the new desired angle for the particular facet that is then to be exposed.

Figure 2:
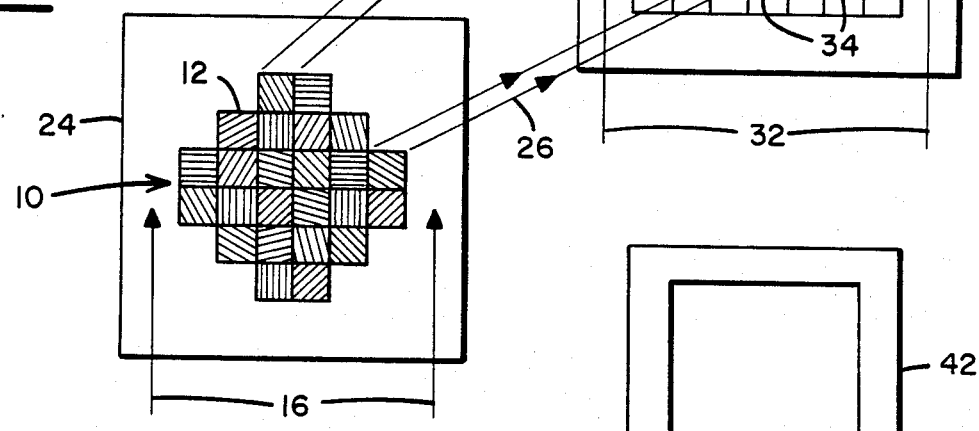
FIG. 2 illustrates how the second hologram is exposed by the spatially redistributed light from the first hologram and a reference wave.

In FIG. 2, we assume that the first holograph 10 is complete and located in first plane 24 where it is illuminated with the uniform intensity reference plane wave 16. The various facets 12 in holograph 10 diffract portions of the incident plane wave at different angles 26 such that the diffracted light is spatially redistributed into some desired output pattern such as the hollow box 28 when the light arrives at the plane labeled 30. In this case, we are showing a one-to-one mapping in that each facet 12 of the first hologram 10 maps light to a different spatial location in plane 30. Stated somewhat differently, each facet 12 in the first hologram 10 produces only a single diffracted wave and no diffracted waves overlap at plane 30.

The quasi-circular cross sectional arrangement of the facets 12 in the first hologram 10 is to match generally the cross sectional shape of a laser beam.

Additionally, FIG. 2 shows the holographic exposure of a second hologram which is located in plane 30. The object beam for the second hologram consists of the spatially redistributed light 26 arriving at plane 30. The reference beam in this case is a uniform intensity plane wave 32. The intensity of the plane wave 32 is adjusted to be the same as that of the light in the individual areas 34 of the object wave 26. (All areas 34 will have the same intensity in this construction method.) This unity beam intensity ratio between the object and reference waves in plane 30 produces interference fringes with maximum contrast which is desirable for hologram recording. The object and reference waves impinging simultaneously into a holographic film located in plane 30 record the second hologram all at one time the completed second hologram appearing in FIG. 3 and being indicated by the reference numeral 36.

Figure 3:
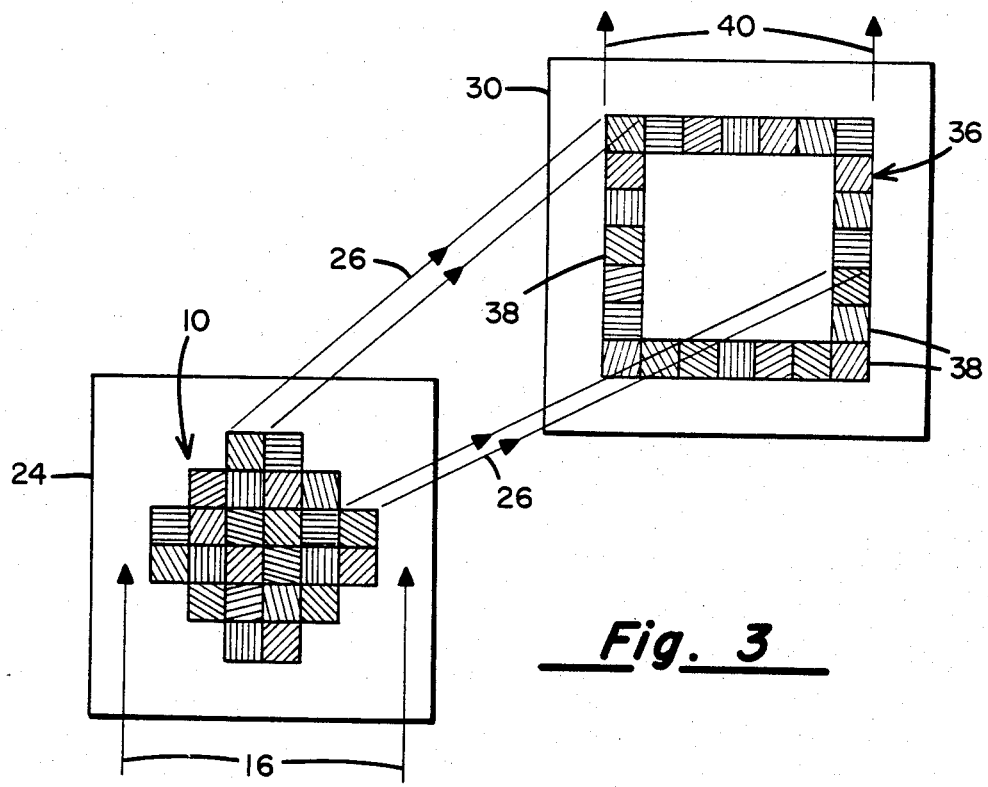
FIG. 3 shows how the final hologram optical system is used to produce a wave front with a desired intensity distribution.

In FIG. 3, the second hologram 36 has been developed and replaced exactly in the position in plane 30 that it occupied during exposure in plane 30 of FIG. 2. In other words, the spatial relation of the planes 24 and 30 of FIG. 3 is exactly the same as in FIG. 2. The uniform intensity plane reference wave 16 again illuminates the first hologram 10 to produce the diffracted waves 26 that arrive at the second hologram 36. The second hologram 36, through the agency of its facets 38, further diffracts the waves 26 to redirect them all in one common propagation direction 40, that direction being the same as that of the reference beam 32 in FIG. 2. By the principles of holography, the phase across the wave front 42 diffracted from the second hologram 36 will be the same as that across the reference wave 32 used to record the second hologram 36. In this example, the reference wave 32 was a plane wave so that the wave front is flat. Because of the flat wave front, the hollow box shaped diffracted wave 42 will maintain its shape as it propagates in the direction 40 away from the second hologram 36. This is extremely useful because the object to be illuminated by the light 42 can now be located at any reasonable distance after the second hologram 36. It can be appreciated that since the various waves 26 arrive at the second hologram plane 30 from different angles, the box shaped pattern 28 would only exist exactly in plane 30 if the second hologram 36 were not used. That is, without the second hologram 36, the illumination pattern would have the box shape in plane 30 but would diverge into another arbitrary shape after that plane. Thus if we wish to illuminate a square box, the box would have to be located exactly in plane 30. As described above, however, by use of the second hologram 36, we gain the additional flexibility of being able to locate our object in an arbitrary plane. Additionally, since both of our holograms 10, 36 are recorded in volume phase materials, such as dichromated gelatin, which can have nearly 100% diffraction efficiency, there are no light losses associated with using multiple holograms.

It should further be pointed out that other wave fronts could also be chosen for the reference wave 32 in FIG. 2. For instance, if a diverging spherical wave were used for the reference wave in recording the second hologram 36, then the wave front 42 eventually produced by the second hologram 36 in FIG. 3 would be diverging as it propagates. That is, by the mechanism of the second hologram 36, the wave front 42 emerging from the second hologram 36 would maintain its box-like shape but would slowly expand in its lateral size as the wave front propagates in direction 40. Thus if a box-shaped object of arbitrary size were to be illuminated, one need only adjust the distance of the box from the second hologram 36 so that the illumination size matches the box size for optimum light utilization.

Figure 4:
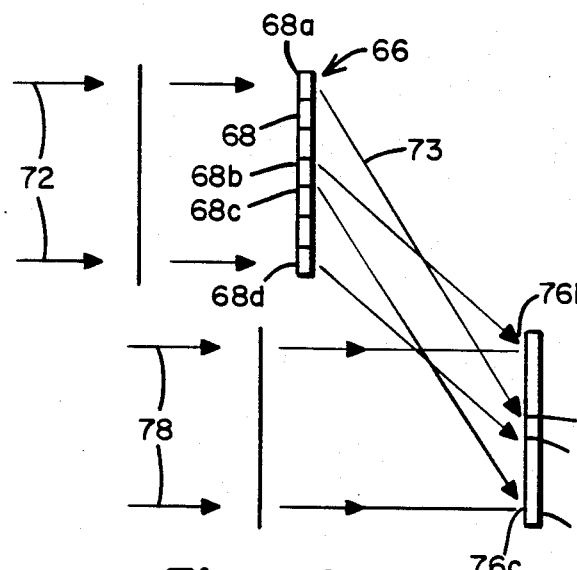
FIG. 4 shows a top plan view of the making of a second hologram that is exposed all at one time by light from a first hologram and a reference wave front.

FIG. 4 is a top plan view of the construction of a second hologram in my optical system. The particular holographic optical element illustrated here will be used to "invert" a Gaussian laser beam—that is to take the intense light which normally exists at the center of a laser beam and move it to the outside of the beam while simultaneously moving the weak light normally at the periphery of the beam into the beam center, this transformation being useful for providing more nearly uniform illumination to spherical objects.

Referring in more detail to FIG. 4, in which the making of a second holographic optical element 74 (see FIG. 5) is illustrated, it can be mentioned that the first hologram 66 has previously been completely exposed and developed as far as each and every facet 68 thereof is concerned. The element 66 will be illuminated with a uniform intensity input beam or wave front indicated generally by the reference numeral 73 (or a uniform intensity wave with another phase curvature) so that each facet 68 diffracts the same amount of energy.

Figure 5:
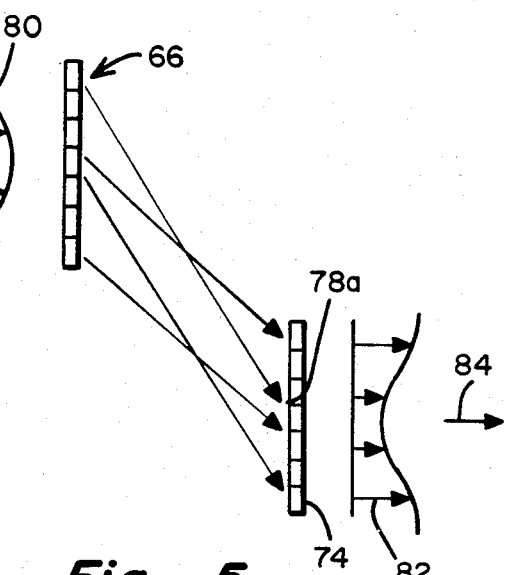
FIG. 5 shows a top plan view of the two holograms of FIG. 4, which together comprise a unit, being used in a readout operation.

Continuing with the description of FIG. 4, the diffracted light, which has been denoted generally by the numeral 73, from the first hologram or element 66 will arrive at the plane in which a photographic film 74a has been placed, more specifically the film that is to form the second holographic element 74 (FIG. 5). The light 73 will function as the signal or object beam for the recording of the second hologram 74. For the moment, it will again be assumed that the light emerging from one input facet 68a as far as the first holographic element 66 is concerned gets mapped or directed on one area 76a of the film 74a which will form a facet at 78a as far as the second holographic element 74 is concerned. The same holds true for the facets 68b, 68c and 68d, and the areas 76b, 76c and 76d that are struck by the light from these facets 68b — 68d. Thus, all illuminated areas 76 in the plane in which the film 74a resides will be illuminated with the same intensity. The reference beam or wave identified by the reference numeral 78 in FIG. 4, this being the reference beam for the film 74a that is to form the second hologram 74, will have a uniform intensity across its wave front and is again a plane wave as far as this example is concerned.

It will be mentioned at this time that the intensities of the signal beam 73 and the reference beam 78 at any point on the film such as 76a will be equal so that the interference fringe contrast at the plane in which the film resides will be maximized and the resulting hologram 74 recorded by reason of the film 74a being in this plane can have a maximum diffraction efficiency.

It should be explained and made clear that the second hologram 74 is made by exposing all of the areas 76 of the film 74a at one time. The reason for this is to take advantage of the constant (or smoothly varying) phase across the reference beam 78, it being desired that the constant or smoothly varying phase first be recorded into the second hologram 74. Consequently, after the second hologram 74 is exposed and developed, it must be replaced exactly in the position it occupied during exposure.

Passing to FIG. 5, FIG. 5 depicting the general readout geometry for the holograms 66 and 74, it can be explained that since an expanded laser beam 80 is likely to have the intensity pattern depicted at the left in FIG. 5, the beam that has been shown possessing a uniphase wave front and Gaussian intensity distribution in order to simulate the expanded laser beam that is likely to be available. The input beam 80 is mapped or diffracted by the two holograms 66, 74 into an output beam 82 with another intensity distribution (the inverted Gaussian) across its wave front. By the principles of holograpy, the phase across the output beam wave front will match that of the reference beam 78 utilized in FIG. 4. In FIG. 4, the reference beam 78 is planar, although it could also possess other shapes, for instance being converging spherical, diverging spherical, etc. All that need be assumed for the moment is that the phase front of the input wave or beam 80 in FIG. 5 matches that of the readout beam 72 of FIG. 4.

The distinct advantage in having a smoothly varying or flat wavefront phase, as indicated by the output beam 82 leaving the second hologram 74 in FIG. 5, stems from the fact that the wavefront intensity distribution will not change rapidly as the output wave propagates in a horizontal direction, that is in the "Z" direction, indicated by the reference numeral 84. This means that an object can be located some distance from the second holographic optical element 74 and still be illuminated with the desired intensity profile. The flat or smoothly varying phase front across the output beam also means that the light emerging from the second optical element 74 in FIG. 5 is suitable for performing interferometry.

It can be appreciated from the foregoing that an arbitrary wave front can be transformed with my invention. The system has a relatively low weight, since only thin substrate films are employed as the holographic optical elements. Cost savings can be appreciable by virtue of the fact that no surfaces need to be optically ground. Still further, the hologram elements can be replicated optically via standard hologram copying methods to be described later.

Figure 6:
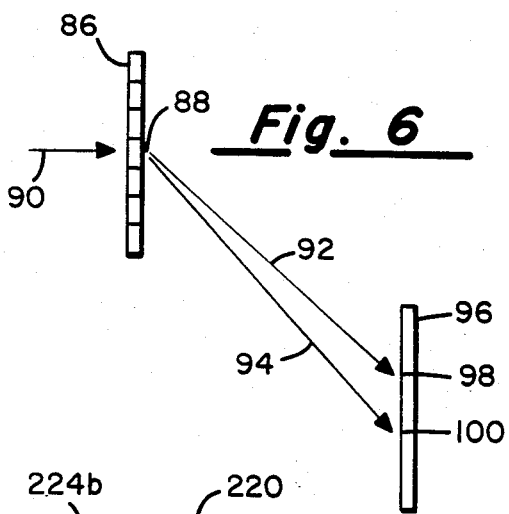
FIG. 6 is a top plan diagrammatic view depicting a single part of the input beam being split into two angularly separated output beams by reason of the facet having been double-exposed so that it acts as both a beam splitter and deflector.

In FIG. 6, a top plan view of a two hologram system, is shown in which the first holographic optical element 86 has a facet 88 (one of many of which the element 86 is comprised) that is double-exposed so that it acts as a beam splitter and deflector. In this instance, a part of the input beam labeled 90 is split into two output beams labeled 92 and 94. The resulting output beams 92 and 94 are not only at an angle with respect to the input beam 90 but at an angle with respect to each other. Of course, the gratings recorded in the double-exposed facet 88 of the hologram 86 located in a first plane determine the angulation of the two beams 92, 94. Thus, the two output beams 92, 94 impinge or strike a second plane denoted by the reference numeral 96 at two separate and spaced locations 98, 100 in this particular plane 96. Thus, FIG. 6 illustrates the means by which the energy in one part of an input beam 90 can be split in any desired ratio (in accordance with the relative exposures in the double exposure used for recording facet 88) and distributed to two different output locations 98 and 100. Such a process may be useful, for instance, for more uniformly distributing the light from an input beam (e.g. 80 in FIG. 5) that may be too intense at the center. The process can trivially be extended to producing more than two beams from one facet.

Figure 7:
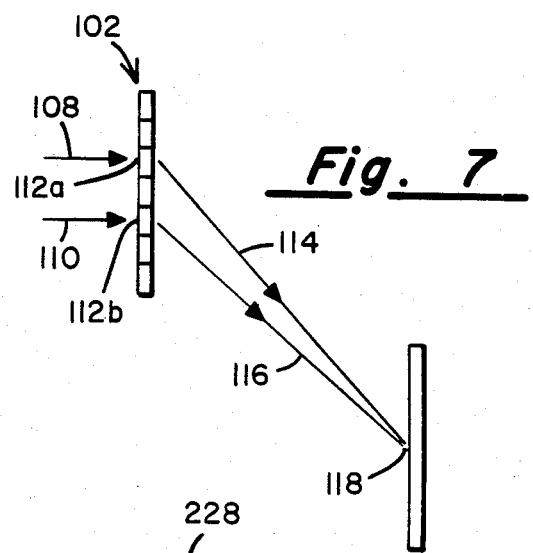
FIG. 7 is a further top plan diagrammatic view showing two parts of the incoming beam that impinge on different facets having individual gratings such that the diffracted beams combine and reinforce each other at the target plane.

FIG. 7 is a complement to FIG. 6, being a top plan view showing how a first hologram 102 can be used to increase the light intensity at a given output location by combining the input energy from two separate facets. More specifically in FIG. 7, two parts 108 and 110 of the input wave front strike different facets 112a and 112b of the holographic optical element 102 presented in this figure. Depending upon the grating incorporated into the two facets 112a, 112b, the output beams 114 and 116 will be deflected in a manner determined by the specific interference pattern contained in these facets 112a and 112b. In the illustrative instance, it will be noted that the deflected beams 114 and 116 are each at an angle with respect to each other, the angle thereof being such that when the two beams 114, 116 strike the plane 118, then only a single area on the plane 118 is illuminated. In other words, as far as FIG. 7 is concerned, the two output beams 114 and 116 reinforce each other. A second hologram can then be employed in the plane 118, such as the holograms 36 and 74 in FIGS. 3 and 5, respectively, to combine the two waves 114 and 116 into one final output beam.

Figure 8:
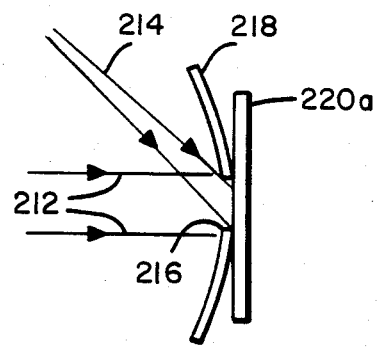
FIG. 8 is a top plan view showing the exposure of a facet in the first hologram with a diverging object wave.

In FIGS. 8 through 11, another method for altering the intensity profile of an input beam is illustrated. In FIG. 8, the exposure of a portion of a photographic film 220a (which becomes a facet in the first hologram 220 in FIG. 9) is shown where a plane reference wave 212 and a diverging object wave 214 are used. It is further assumed that the size of the aperture 216 in the exposure mask 218 and the object beam divergence can be varied for the exposure of different facets.

Figure 9:
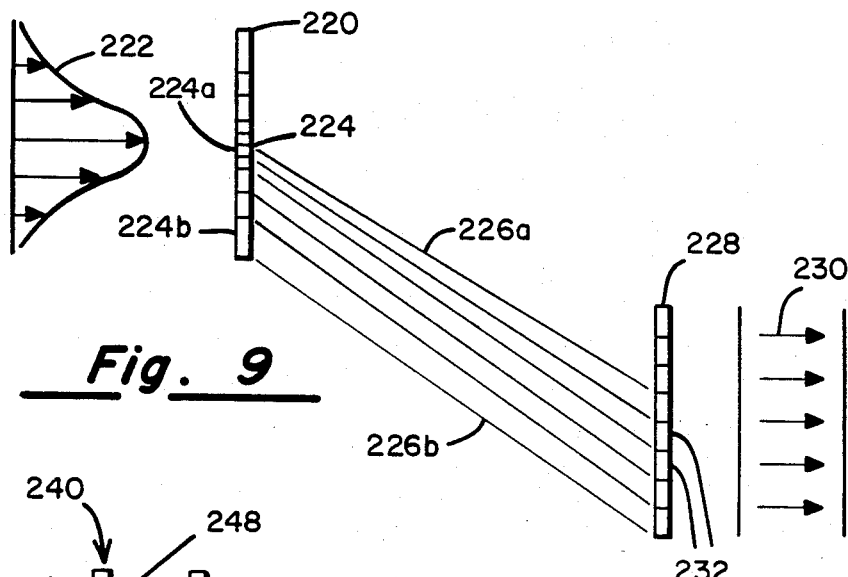
FIG. 9 depicts the use of two holograms, one of which is shown in FIG. 8, the two holograms constituting a holographic optical unit and coacting to provide an output beam or wave front having a uniform light intensity.

In FIG. 9, we show how such a first hologram 220 would be used. Assuming that the input beam labeled 222 in FIG. 9 varies in intensity according to the depicted profile, then the centralmost facets 224a of hologram 220 would be smaller and the peripheral or outermost facets 224b of the element 220 would be larger. Furthermore, as can be understood from FIG. 9, each of the small facets 224a would produce an output beam 226a from the first holographic optical element 220 that expands as it propagates while the light 226b from the peripheral facets 224b does not expand or may even converge as it propagates.

In this illustrative example, it is assumed that the size of the facets 224 in the first hologram 220 is approximately inversely proportional to the intensity of the input beam 222. That is, the facets 224 will vary in size such that the optical power passing through each facet 224 in hologram 220 is nearly constant. Additionally, the beam divergence and deflections from the various facets are controlled during construction such that the light from each facet 224 in hologram 220 will expand or contract to illuminate the same size total area in the second hologram plane. In this manner, the intensity of the light (power/area) at the second hologram 228 will be nearly constant.

The second hologram 228 can be recorded by using the readout wave 222 and the first hologram 220 to produce the uniform intensity object wave in the second plane which interferes with a plane reference wave (such as wave 78 in FIG. 4) to record hologram 228. FIG. 9 actually shows both holograms 226 and 228 in use to produce a uniform intensity plane wave output 230.

Figure 10:
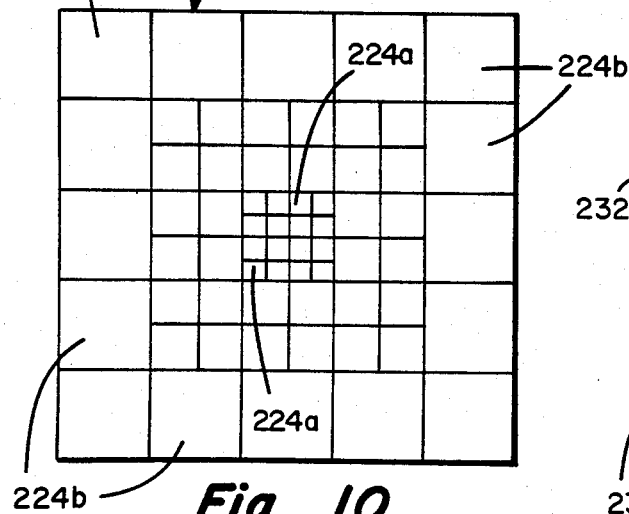
FIG. 10 is a front elevational view of the first holographic optical element in FIG. 9.
Figure 11:
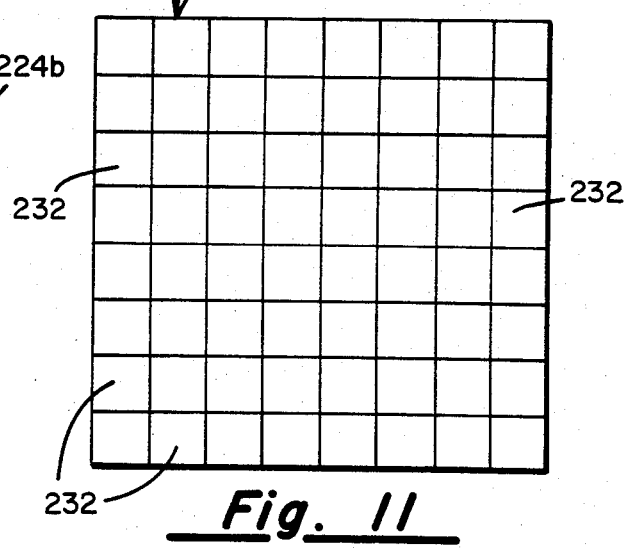
FIG. 11 is a front elevational view of the second holographic optical element shown in FIG. 9.

FIGS. 10 and 11 are illustrative examples of how holograms 220 and 228 respectively, might look when viewed from the front. In FIG. 10, hologram 220 is shown to have small facets 224a in its center and larger facets 224b at its periphery. With a readout beam such as 222 in FIG. 9 which is more intense at its center, approximately equal energy will pass though the various facets 224 of hologram 220. This energy will then be appropriately diverged and deflected by the facets 224 of hologram 220 so that it forms a regular array of equal intensity and equal size waves which will expose the facets 232 of hologram 228. These equal facets 232 are illustrated in FIG. 11.

Figure 12:
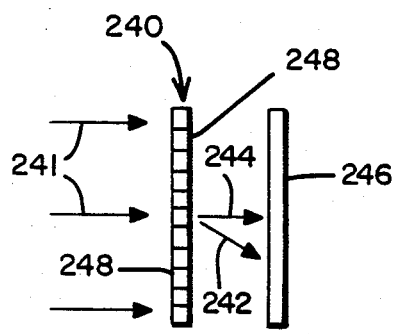
FIG. 12 shows how a multi-faceted holographic optical element can be replicated or copied.

In conjunction with the preceding discussion, we also indicate how any of the first holographic optical elements in our various systems can be quickly and economically copied. To illustrate how a copying can be achieved, reference is at this time made to FIG. 12 in which the master holographic optical element has been identified by the reference numeral 240. If the hologram 240 has a 50% diffraction efficiency, then the incident energy 241 striking the master hologram 240 would have 50% thereof go into the diffracted wave 242 and the remaining 50% would be transmitted therethrough so as to act as the reference wave 244 for the copy film 246. This provides a one-to-one beam ratio for the copy hologram exposure so that maximum fringe contrast and optimum exposure can be obtained. The copy hologram could be exposed so as to possess a 100% diffraction efficiency. Although shown separated in FIG. 12, the emulsions of the two elements 240 and 246 would in practice be in contact with each other for the copying operation in order to avoid vibration problems and also to provide maximum overlap of the beams 242 and 244 from each facet 248 of the hologram 240. In practice, an index matching liquid such as xylene would be placed between the two film plates to eliminate surface reflections therebetween.

Figure 13:
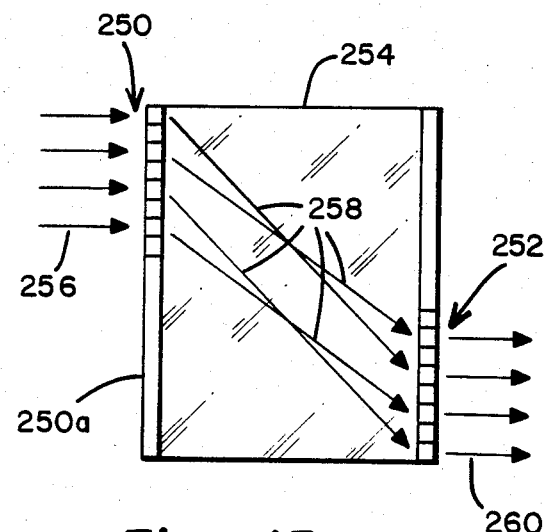
FIG. 13 shows how the two holograms of FIG. 5 can be cemented to a glass block to prevent misalignment.

FIG. 13 illustrates one method by which precise alignment between a first hologram 250 and a second hologram 252 can be maintained. After exposure and processing as shown in FIG. 1, the first hologram 250 is cemented to a glass block 254. An unexposed but sensitized film, which becomes the hologram 252, is cemented to the other side of the block. When the first hologram 250 is illuminated with wave 256, it diffracts the labeled waves 258 which propagate to form the desired redistributed pattern on the photosensitive emulsion of the film. A wave not shown but brought in through area 250a on the block 254 will serve as the reference wave to record the second hologram 252 on the lower portion of film in producing the hologram 252. The film, it will be understood, is developed on the block 254, in producing the hologram 252. The final two hologram systems are shown in use in FIG. 13 where the input wave 256 is diffracted by the two holograms 250, 252 to produce output wave 260. The rigidity of the glass block 254 prevents misalignment and also prevents air motion which causes undesired phase shifts between the two holograms 250 and 252.

In the design of the optical system made use of in the practicing of my method, a number of tradeoffs can be considered. For moderately thick hologram films (649-F used as dichromated gelatin) the deflection angle for the holograms should be equal to or greater than 25° to obtain maximum efficiency. The separation between the two holograms has to be large enough so that the light diffracted from the first hologram can be redistributed by the time it gets to the plane containing the second hologram without having to travel at too great an angle between the holograms. On the other hand, as facets are made smaller and smaller, largely to obtain better redistribution resolution, Fresnel diffraction from the small facets will become more of a problem if the distance between holograms is too large. Consequently, the distance will have to be moderate. Calculations and empirical procedures can be made to quantify these tradeoffs and accomplish an optimization as far as the system's design is concerned.

As dealt with to some extent in my co-pending application, the ability to produce holographic optical elements that function in the infrared range is quite useful. This is true for the present invention as well. However, because holographic films must use visible light for recording and we ultimately wish to use infrared for readout, the phase correction for the second hologram is more difficult inasmuch as the hologram is not being recorded at the end use wavelength. In other words, one does not obtain the automatic phase correction that is achieved by recording with the plane reference wave shown in FIGS. 2 and 4. Depending upon the particular application to which my method is put, the phase may have to be corrected individually for each facet as far as the second hologram is concerned. A number of corrective schemes could be selected. One suitable example would be to read out the first hologram with an infrared beam so that it produced the signal wave at the second plane. An infrared reference beam would be used to illuminate the film placed in the second plane. It will be appreciated that the film will not be exposed by these beams inasmuch as it is not sensitive to infrared radiation.

Figure 14:
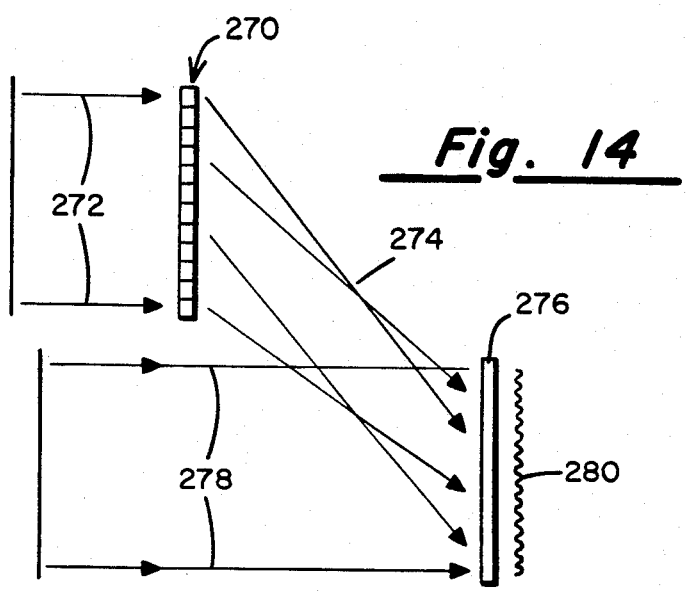
FIG. 14 is a top plan diagrammatic view showing generally how phase correction is achieved for infrared optical elements.

FIG. 14 is a top plan diagrammatic view representing the method alluded to above in which the phase for each facet or area of a second holographic optical element is corrected individually. This is done by reading out the hologram 270 with an infrared beam 272 to produce a signal beam 274 which strikes the film 276 which is to be the second holographic element. An infrared reference beam 278 also illuminates the film 276 to produce an infrared interference pattern 280.

Figure 15:
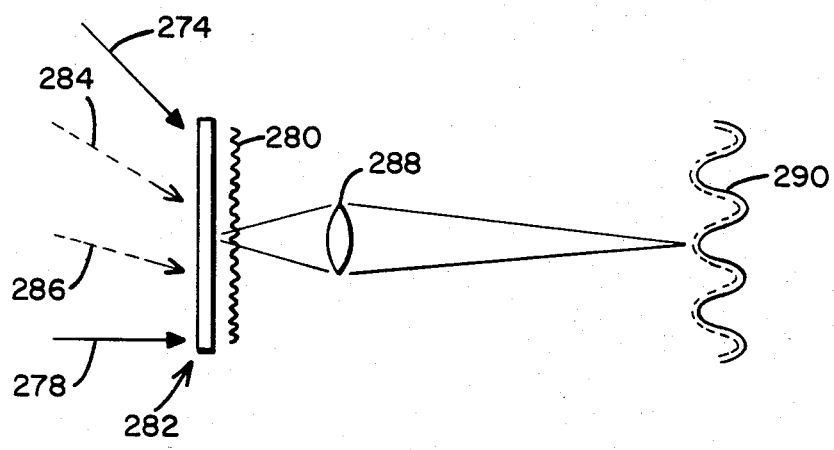
FIG. 15 is a top plan diagrammatic view supplementing FIG. 14, this view being concerned with the exposure of a single facet in the second hologram.

Each facet of the second hologram must be corrected individually as better shown in FIG. 15. Here, a single facet 282 is being constructed, this facet 282 constituting only a small surface area as far as the film 276 is concerned. In addition to the infrared object beam 274 and the infrared reference beam 278, as present in FIG. 14, the facet 282 in FIG. 15 is illuminated with a very weak exposing object beam 284 and very weak reference beam 286, the beams 284, 286 being sufficiently weak so as not to be recorded appreciably in the gelatin of the facet 282 of the film 276. The correct spatial frequency match between the interference patterns of the two infrared beams 272, 278 and the two exposure beams 284, 286 can be adjusted while observing their overlapping interference patterns denoted by the reference numeral 280. Phase matching can also be done while observing the two interference patterns 280, such as with a microscope 288. The magnified interference patterns have been indicated by the reference numeral 290. Of course, an infrared viewer (not shown) will have to be employed.

However, the method would most likely be carried out under the control of a computer so that the phase matching could be done quickly in order not to fog the film facet 282 with the exposure beams 284, 286, even though of weak intensity. The required tilt of the exposure fringes within the volume of each film facet will be calculated and adjusted ahead of time so that the correct Bragg readout in the infrared range can be achieved as described in an article by the author appearing in the journal *Applied Optics* volume 17, page 2537 (1978). This construction will require proper steering of both the exposure object beam 284 and of the reference beam 286. The above procedure will then be repeated for each facet 282.

Consequently, where unusually shaped objects must be illuminated with laser light, or where it is desired to transform an entire laser beam into a specific shape, such as for the laser printing of a manufacturer's symbol onto a product, my method offers considerable flexibility and economical use of laser power. The low production cost of holographic optical elements made according to my invention, as compared with the making of computer-generated holograms, makes it possible, and well within the realm of practicality, to produce a large variety of holographic optical elements that will enable my method to be employed in various industrial situations.

For example, it is now becoming commonplace to examine aircraft gas turbine blades by using laser beams. Since the blades are peripherally disposed on a central rotor, the laser light should be in an annular pattern, more specifically in an annular ring in which the blades reside. My method permits the redistribution of light so that the light which originally had a Gaussian intensity distribution is now concentrated in the annular ring where the blades are situated. Also, it should be recognized that the blades need not be located in a target plane of any definite location, for my invention permits the propagation of the laser light in a manner such that the blades (or other object) can be positioned at various locations spaced from the holographic optical elements made use of in the practicing of my invention.

Consequently, it should be apparent that my invention enables laser light to be transformed into whatever pattern is most suitable for the result to be achieved.

I claim:

1. A method of redistributing light from a first plane to a second plane spaced from said first plane comprising the steps of: fixedly positioning in said first plane one holographic optical element containing a plurality of closely adjacent facets spatially arranged in a predetermined relationship with respect to each other, each facet having an interference grating for receiving a portion of input light having a first intensity pattern and each of said facets simultaneously diffracting that portion of said input light it receives in a direction so as to cause the diffracted output light from each of said facets to simultaneously arrive at a difference relative locating in said second plane from the relative location of the particular facet producing said output light and to cause the diffracted output light from said plurality of facets to be spatially redistributed in a second intensity pattern differing from said first and intensity pattern and to collectively and simultaneously impinge on a desired area residing in said second plane in a predetermined relationship differing from the predetermined relationship of said facets with respect to each other.

2. The method of claim 1 in which said input light is in the form of a first single beam and said output light is in the form of a second single beam forming an angle with respect to said first beam.

3. The method of claim 1 including the step of positioning a second holographic optical element in said second plane so that the diffracted output light from said one holographic optical element impinges on said second holographic optical element to further diffract the output light from said one halographic optical element.

4. The method of claim 3 in which all the output light from the second holographic element propagates in the same direction to maintain said predetermined pattern in an arbitrary third plane.

5. The method of claim 4 in which the output light from the second holographic element coverges as it propagates between said second and third planes.

6. The method of claim 4 in which the output light from the second holographic element diverges as it propagates between said second and third planes.

7. The method of claim 1 in which said input light includes a single first beam providing said first intensity pattern and said output light includes second and third beams extending at angles with respect to said first beam and at an angle with respect to each other to provide said second intensity pattern.

8. A method of redistributing light from a first plane to a third plane via a second intermediate plane, the method comprising the steps of: fixedly positioning in said first plane the first holographic optical element containing a plurality of closely adjacent facets arranged in a predetermined relationship relative to each other, each facet having an interference grating for receiving a portion of input light in the form of a single beam; said facets simultaneously diffracting said input light in the form of a second beam having a first illumination pattern so as to cause the diffracted output light in the form of said second beam to impinge on said second plane to produce a second illumination pattern in said second plane differing from said first illumination pattern; and fixedly positioning in said second plane a holographic element containing a plurality of closely spaced facets arranged in a second predetermined relationship relative to each other, each facet of said second holographic optical element causing the second beam constituting the output light from said first holographic optical element to impinge on said third plane to maintain said second illumination pattern in said third plane, the arrangement of said facets contained in said second holographic optical element differing from the arrangement of said facets contained in said first holographic element and the interference pattern of each of said facets contained in said second holographic optical element being such as to collectively produce said second pattern.

9. The method of claim 8 in which certain of the facets of said first holographic optical element are smaller than those facets of said second holographic optical element receiving light from said smaller facets of said first holographic optical element.

10. The method of claim 9 in which additional facets of said first holographic optical element are larger than those facets of said second holographic optical element receiving light from said additional facets of said first holographic optical element.

11. The method of claim 8 in which at least some of the facets of said first holographic optical element have a size inversely proportional to the intensity of said input light so that each facet of said first holographic element has the same amount of power passing through it, and wherein said facets of said second holographic optical element are of equal size so that the output light intensity from said second holographic optical element is substantially constant.

12. A method of aligning first and second holograms to redistribute input light from a first plane to a second plane comprising the steps of: securing the first hologram to one side of a transparent block; and securing the second hologram to an opposite side of said block, each of said holograms including a plurality of closely adjacent facets, each of the facets of said first hologram being positioned at predetermined locations relative to each other for diffracting a portion of the input light striking said first hologram so that the total diffracted output light from said plurality of facets is transmitted through said transparent block in a spatially redistributed pattern onto said second hologram at predetermined locations relative to each other differing from the predetermined locations of the facets of said first hologram relative to each other and the light propagated from said second hologram retaining said redistributed pattern therein.

13. The method of claim 12 in which said transparent block is glass and its said sides are parallel.

14. A method of aligning a second hologram with a first hologram comprising the steps of: securing a first hologram to one side of a transparent block, said first hologram containing therein a plurality of closely adjacent facets positioned at predetermined locations relative to each other for collectively diffracting input light into a desired redistributed light pattern, securing a photosensitive film to an opposite side of said block, exposing said first hologram to an object wave to form the desired redistributed pattern on said film, and simultaneously exposing said film to a reference wave to record a second hologram containing therein a plurality of facets positioned at predetermined locations relative to each other which predetermined locations differ from the predetermined locations of the facets of said first hologram.

15. The method of claim 14 in which said transparent block is glass and its said sides are parallel.

16. A method of redistributing light from a first plane to a second plane spaced from said first plane comprising the steps of: fixedly positioning in said first plane a holographic optical element containing a plurality of closely adjacent facets, each facet having an interference grating for receiving input light in the form of either a first or second beam, each of said first and second beams being directed onto different facets; and diffracting said input light in a direction so as to cause the diffracted output light to be spatially redistributed and to impinge on a desired area residing in said second plane in a predetermined illumination pattern, said output light including third and fourth beams and said third and fourth beams being at an angle relative to said first and second beams.

17. The method of claim 16 in which said first and second beams providing said input light are parallel to each other.

18. The method of claim 17 in which said third and fourth beams providing said output light are at angles with respect to each other and at different angles with respect to said first and second beams providing said input light.

19. The method of claim 18 in which said third and fourth beams providing said output light converge to substantially the same point in said second plane.

* * * * *